United States Patent
Katayama et al.

(10) Patent No.: US 6,187,459 B1
(45) Date of Patent: Feb. 13, 2001

(54) COMPOSITE MAGNETIC MEMBER, PROCESS FOR PRODUCING THE MEMBER AND ELECTROMAGNETIC VALVE USING THE MEMBER

(75) Inventors: Yoshitada Katayama; Keizo Takeuchi, both of Handa; Toshiaki Terada, Okazaki; Shinya Sugiura, Kariya; Hakaru Sasaki, Tokyo; Tsutomu Inui, Yonago, all of (JP)

(73) Assignees: Nippondenso Co., Ltd., Kariya; Hitachi Metals, Ltd., Tokyo, both of (JP)

( * ) Notice: Under 35 U.S.C. 154(b), the term of this patent shall be extended for 0 days.

(21) Appl. No.: 09/149,082

(22) Filed: Sep. 8, 1998

Related U.S. Application Data

(62) Division of application No. 08/262,067, filed on Jun. 17, 1994, now Pat. No. 5,865,907.

(30) Foreign Application Priority Data

Jun. 18, 1993 (JP) .................................................... 5-147893

(51) Int. Cl.⁷ ....................................................... G11B 5/66
(52) U.S. Cl. .............. 428/692; 428/634 T; 428/634 TM; 428/900
(58) Field of Search .................................. 428/692, 634 T, 428/634 TM, 900

(56) References Cited

U.S. PATENT DOCUMENTS

| | | | |
|---|---|---|---|
| 2,489,520 | 11/1949 | Camras | 148/101 |
| 3,953,252 | 4/1976 | Levin | 148/120 |
| 4,007,073 | 2/1977 | Levin | 148/120 |

(List continued on next page.)

FOREIGN PATENT DOCUMENTS

| | | |
|---|---|---|
| 247 893 | 11/1965 | (AT) . |
| 2 059 971 | 6/1972 | (DE) . |
| 4 226 695 | 2/1993 | (DE) . |

(List continued on next page.)

OTHER PUBLICATIONS

Hirayama et al., "Influence of Chemical Composition on Martensitic Transformation in Fe–Cr–Ni Stainless Steel", *Journal of the Society of Metallurgy,* Japan, vol. 34, No. 5, 507–510 (1970).

Hirayama et al., "Influence of Working Temperature on Martensitic Transformation in Fe–Cr–Ni Stainless Steel", *Journal of the Society of Metallurgy,* Japan, vol. 34, No. 8, 826–829 (1970).

(List continued on next page.)

*Primary Examiner*—Leszek Kiliman
(74) *Attorney, Agent, or Firm*—Pillsbury Madison & Sutro Intellectual Property Group

(57) ABSTRACT

A metallic member including not more than 0.6% C, 12 to 19% Cr, 6 to 12% Ni, not more than 2% Mn, not more than 2% Mo, not more than 1% Nb and the balance being Fe and inevitable impurities, where Hirayama's equivalent H eq=[Ni %]+1.05 [Mn %]+0.65 [Cr %]+0.35 [Si %]+12.6 [C %] is 20 to 23%;

Nickel equivalent Ni eq=[Ni %]+30 [C %]+0.5 [Mn %] is 9 to 12%, and

Chromium equivalent Cr eq=[Cr %]+[Mo %]+1.5 [Si %]+0.5 [Nb %] is 16 to 19, wherein % is by weight, is made to have at least one ferromagnetized part having a magnetic flux density $B_{4000}$ of not less than 0.3T and at least one non-magnetized part having a relative magnetic permeability $\mu$ of not more than 1.2 at a temperature of not less than −40° C., as continuously and integrally formed. The non-magnetized part has crystal grain sizes of not more than 30 $\mu$m. The metallic member is subjected to by ferromagnetization and successive local non-magnetization of part or parts of the ferromagnetized member, and the thus obtained composite magnetic member is employed as a support member such as a sleeve in electromagnetic valves.

2 Claims, 14 Drawing Sheets

U.S. PATENT DOCUMENTS

| | | | |
|---|---|---|---|
| 4,042,423 | 8/1977 | Van Den Sype | 148/578 |
| 4,539,542 | 9/1985 | Clark | 335/261 |
| 5,174,832 | 12/1992 | Schmid | 148/122 |

FOREIGN PATENT DOCUMENTS

| | | |
|---|---|---|
| 63-161146 | 7/1968 | (JP) . |
| 63161146 * | 7/1968 | (JP) . |
| 60-158607 | 8/1985 | (JP) . |
| 62-83620 | 4/1987 | (JP) . |
| 63-105952 | 5/1988 | (JP) . |
| 64-22412 | 1/1989 | (JP) . |

OTHER PUBLICATIONS

Hirayama et al., "Influence of Working Temperature on Mechanical Properties of Fe–Cr–Ni Stainless Steel", *Journal of the Society of Metallurgy*, Japan, vol. 34, No. 8, 830–835 (1970).

Hirayama, "Influence of Cold Reduction on Martensitic Transformation in Fe–Cr–Ni Stainless Steel", *Journal of the Society of Metallurgy*, Japan, vol. 35, No. 5, 447–451 (1971).

Patent Abstract of Japan, vol. 12, No. 433, Nov. 15, 1988 146.

* cited by examiner

CIRCUMFERENTIAL DIRECTION

COMPOSITE MAGNETIC MEMBER, PROCESS FOR PRODUCING THE MEMBER AND ELECTROMAGNETIC VALVE USING THE MEMBER

This is a division of application Ser. No. 08/262,067, filed Jun. 17, 1994, now U.S. Pat. No. 5,865,907.

BACKGROUND OF THE INVENTION

1). Field of the Invention

The present invention relates to a composite magnetic member comprising at least one non-magnetized part and at least one ferromagnetized part, both parts being continuously and integrally formed, a process for producing the member and an electromagnetic valve using the member, and particularly to a composite magnetic member capable of fully maintaining ferromagnetic and non-magnetic characteristics against changes in temperature, a process for producing the member and an electromagnetic valve using the member.

2). Description of the Related Art

In generating a magnetic circuit in products such as electromagnetic valves, etc. by discretely providing a ferromagnetic part and a non-magnetic part in one product, it is necessary to make a mild steel part from a ferromagnetic material and an austenitic stainless steel part from a non-magnetic material individually, then assemble the ferromagnetic part and the non-magnetic part together while joining the parts properly by bonding, for example, by soldering, to make a member for the magnetic circuit. However, in making a member for the magnetic circuit in this manner, it is necessary to make a plurality of parts from a ferromagnetic material and a plurality of parts from a non-magnetic material individually and assemble such pluralities of the parts, while joining them by bonding. Thus, many steps and much labor are required for making such a member, complicating the procedure.

It is known that ordinary austenite stainless steel, high manganese steel, etc. are in a non-magnetic state after solid-solution treatment, but can be given a ferromagnetic property by cold working at room temperature to induce and generate a martensite structure. However, the degree of ferromagnetization obtained by this procedure is not high and thus it is actually difficult to apply this procedure to the production of members for the magnetic circuit.

It is also possible as a means for locally non-magnetizing part of a ferromagnetic material such as mild steel, etc. to diffuse an austenitizing element such as Mn, Cr, Ni, etc. into the ferromagnetic material from the surface, but such a means still has a problem in the production of members for the magnetic circuit.

JP-A-63-161146 discloses materials utilizable as a magnetic scale by optimizing the composition of austenite stainless steel or high manganese steel and working procedures for such materials to make members having both ferromagnetic and non-magnetic properties at the same time, where metastable austenite stainless steel is cold drawn into wires, thereby ferromagnetizing the austenite stainless steel based on martensitizing of austenite structure and part of the martensitized wires are further subjected to a local solid-solution treatment to locally non-magnetize the martensitized wires on the basis of local back-austenitization. Members having both ferromagnetic and non-magnetic properties at the same time can be obtained thereby. In this case, the composite magnetic members disclosed in JP-A-63-161146 can have a satisfactorily ferromagnetized part and a satisfactorily non-magnetized part, as integrated together, which can work satisfactorily under ordinary circumstances, but no measures have been taken against temperatures at which the non-magnetized parts are to be used. That is, under severe temperature circumstances such as an extremely low temperature circumstance, a martensite structure is generated on the non-magnetized part, thereby transforming the non-magnetic properties to ferromagnetic properties. This has been a problem.

Currently available electromagnetic valves work as follows: a magnetic circuit is generated by passing an electric current through a coil in the valve, and a plunger is actuated through a sleeve undergoing magnetic working by the generated magnetic circuit. Particularly when an electromagnetic valve is used for oil-hydraulic control, the plunger must slide oil-tight along the inside surface of the sleeve. The conventional sleeve is made from a non-magnetic material, and to make the plunger behavior more sensitive, the magnetic circuit must be permeated through the non-magnetic material, and thus the force of excitation of the coil itself must be increased. Still furthermore, it is possible to ferromagnetize only part of the sleeve through which the magnetic circuit is to permeate. In the sleeve structure made by integrating a plurality of parts by bonding, the bonding must be carried out by soldering, welding, or the like to make the sleeve, and thus considerable post-working is required for obtaining desired dimension, shape and precision. Thus, there is a post-working problem.

SUMMARY OF THE INVENTION

An object of the present invention is to provide a composite magnetic member comprising at least one satisfactorily ferromagnetized part and at least one satisfactorily non-magnetized part, both parts being continuously and integrally formed, which can work under severe circumstances such as extremely low temperatures; a process for producing the member; and an electromagnetic member using the member.

At first, the present inventors have carefully checked what physical characteristics are desirable for a composite magnetic member having satisfactory ferromagnetic and non-magnetic characteristics at the same time under ordinary circumstances, and have found that a composite magnetic member is required to comprise a non-magnetized part having a relative magnetic permeability $\mu$ of not more than 1.2 and the remaining ferromagnetized part having a magnetic flux density $B_{50}$ of not less than 0.3 T at the same time except at the transition region between the non-magnetized part and the ferromagnetized part and except parts particularly not required for the ferromagnetic characteristics.

To satisfy the above-mentioned requirements, the present inventors have selected the following composition which can generate a stable austenite structure at room temperature and also generate a martensite structure by cold working to make the cold worked parts ferromagnetic and can give satisfactory magnetic characteristics.

A metallic member that can meet the above-mentioned requirements has a composition which comprises not more than 0.6% C, 12 to 19% Cr, 6 to 12% Ni, not more than 2% Mn, not more than 2% Mo, not more than 1% Nb, and the balance being Fe and inevitable impurities, where it is desirable that:

Hirayama's equivalent H eq=[Ni %]+1.05 [Mn %]+0.65 [Cr %]+0.35 [Si %]+12.6 [C %] is 20 to 23%;

Nickel equivalent Ni eq=[Ni %]+30 [C %]+0.5 [Mn %] is 9 to 12%, and

Chromium equivalent Cr eq=[Cr %]+[Mo %]+1.5 [Si %]+0.5 [Nb %] is 16 to 19%, wherein % is and will be hereinafter by weight.

As to Hirayama's equivalent, reference is made to Nihon Kinzoku Gakkaishi (Journal of the Society of Metallurgy of Japan), 34 No. 5, 507–510 (1970); 34 No. 8, 826–829 (1970); 34 No. 8, 830–835 (1970); 35 No. 5, 447–451 (1971).

The C content is selected to be not more than 0.6% in the above-mentioned composition of the metallic member because shapability by working is lowered with increasing carbide content, though the magnetic characteristics can be satisfied over 0.6% C. The Cr content is selected to be 12 to 19% and the Ni content to be 6 to 12%, since non-magnetic properties, for example, a relative magnetic permeability $\mu$ of not more than 1.2, cannot be obtained below the lower limit Cr and Ni contents, whereas above the higher limit Cr and Ni contents, $B_{4000}$, a magnetic flux density when the intensity of magnetic field is 3.980 A/m, cannot be made less than 0.3 T (0.3 tesla). When the Mn content is over 2%, the shapability by working is lowered. Thus, the upper limit Mn content is selected to be 2%.

Furthermore, specific amounts of Mo and Nb can be contained in the metallic member. Mo, when contained, can effectively lower a Ms point, and Nb, when contained, can effectively contribute to an increase in the strength of the metallic member. Mo or Nb or both Mo and Nb can be contained, depending on the desired purpose. It is preferable that the metallic member contains not more than 2% Mo and not more than 1% Nb. Above these upper limit contents the shapability by working will be lowered.

Limitation of the respective elements to the above-mentioned ranges is still not satisfactory, and it is necessary that desired magnetic characteristics be obtained by combinations within these combination ranges. To this effect, Hirayama's equivalent H eq=20–23%, nickel equivalent Ni eq=9–12% and chromium equivalent Cr eq=16–19% must be satisfied in the present invention. Unless these conditions are not satisfied, only one of desired ferromagnetic characteristics and desired non-magnetic characteristics is satisfied.

Grounds for specifying these conditions will be explained below:

FIG. 1 shows a relationship between a Hirayama's equivalent and a relative magnetic permeability.

As is apparent from FIG. 1, a relative magnetic permeability $\mu$ is lowered with increasing Hirayama's equivalent H eq, and when the Hirayama's equivalent H eq is not less than 20%, a relative magnetic permeability $\mu$ of not more than 1.2 can be satisfied. Thus, the lower limit to the Hirayama's equivalent H eq is selected to be 20%.

FIG. 2 shows a relationship between a draft percentage at cold working and a magnetic flux density $B_{4000}$ after the cold working.

As is apparent from FIG. 2, the austenite structure is stabilized with increasing Hirayama's equivalent H eq, and as a result ferromagnetization by cold working is hard to take place and the magnetic flux density $B_{4000}$ is lowered. At the cold rolling as cold working, $B_{4000}$=0.3 T was hard to obtain over H eq=23%, even if the draft percentage was increased. Thus, the upper limit to Hirayama's equivalent H eq is selected to be 23% in the present invention.

A nickel equivalent Ni eq and a chromium equivalent Cr eq are selected to be 9–12% and 16–19%, respectively, for the same reasons as above.

Usually not more than 2% Si and not more than 0.5% Al as deoxidizing elements and other inevitable impurity elements are contained in the metallic member, but these elements will not give any adverse effect on the characteristics of the composite magnetic member, when produced.

The present inventors have further found that the metallic member having the above-mentioned composition did not have satisfactory magnetic characteristics under severe temperatures, and have made a further extensive study. That is, the present inventors made metallic members satisfying the above-mentioned conditions for the composition and subjected the members to solid-solution treatment to non-magnetize them, and then left them to stand at various low temperatures. As shown in FIG. 3, an increase in the relative magnetic permeability was observed in the members and the requirements of $\mu$=not more than 1.2 as the non-magnetic characteristics were not satisfied.

Thus, it has been found further necessary that the metallic members having the above-mentioned composition satisfy the requirements for ferromagnetic and non-magnetic characteristics at the same time and undergo no change in the relative magnetic permeability $\mu$ of the non-magnetized part even under a severe temperature circumstance.

As a result of further extensive studies, the present inventors have found metal member structures without any change in the relative magnetic permeability $\mu$ even at an extremely low temperature, such as a temperature as low as $-40°$ C. That is, the present inventors have found that an increase in the relative magnetic permeability $\mu$ at an extremely low temperature is due to a fact that the extremely low temperature is lower than an Ms point temperature, i.e. a temperature that initiates to transform the austenite structure to the martensite structure, and have conceived that an increase in the relative magnetic permeability at a temperature as low as $-40°$ C. can be suppressed by making the Ms point temperatures of the metallic members having the above-mentioned composition lower than, for example, $-40°$ C.

Thus, the present invention is characterized by changing grain sizes of austenite crystal grains to make the Ms point temperature lower than the conventional Ms point temperature, thereby suppressing the non-magnetic characteristics from changing to the ferromagnetic characteristics in an extremely low temperature circumstance. That is, the present invention has applied to the composite magnetic members for the first time the following fact the Ms point temperature that initiates to transform the austenite structure to the martensite structure is lowered be decreasing austenite crystal grain sizes.

FIG. 4 shows a conceptual diagram showing the above-mentioned fact. As is apparent from FIG. 4, the austenite crystal grain sizes and the Ms point temperature are closely related to each other and the Ms point temperature is abruptly lowered at a specific crystal grain size.

FIG. 5 shows changes in the relative magnetic permeability $\mu$ of metallic member before cooling and after being cooled to and retained at $-40°$ C. for one hour. As is apparent from FIG. 5, the present inventors have found for the first time that the relative magnetic permeability $\mu$ will not exceed 1.2, even when the metallic members is kept at $-40°$ C., by selecting heating conditions so that the austenite crystal grain size is kept not more than 30 $\mu$m.

The present inventors have furthermore studied an optimum process for making the crystal grain size of austenite part (non-magnetized part) of the metallic member not more than 30 $\mu$m, and have found that the optimum process comprises subjecting the metallic member to cold working, thereby ferromagnetizing the member and then to solid-solution treatment within 10 seconds. That is, the heating of the member must be carried out for a very short time. An increase in the grain size in the region of the member, where the martensite structure is transformed to the austenite structure, can be prevented by conducting the solid-solution treatment within 10 seconds. To this effect, specifically it is desirable to use high frequency heating in the solid-solution treatment.

FIG. 5 will be explained in more detail below That is, FIG. 5 shows a relationship between crystal grain size in the non-magnetized region obtained by local solid-solution treatment of the ferromagnetized part by high frequency heating and changes in the relative magnetic permeability $\mu$ after cooling to and retaining the non-magnetized region at $-40°$ C. As already mentioned above, it has been found that the relative magnetic permeability $\mu$ will not exceed 1.2 even after having retained the non-magnetized region at $-40°$ C. by selecting the heating conditions so that the crystal grain size can be kept not more than 30 $\mu$m.

The present inventors have found the desired conditions for metallic members applicable to desired composite magnetic members, as mentioned above, but have not yet found a fully satisfactory process for producing a desired composite magnetic member. For example, the present inventors tried to make cup-shaped members 10 shown in FIG. 10C by the conventional continuous press drawing work, but have found that the magnetic flux density $B_{4000}$ of not less than 0.3 T, as desired in the present invention, could not constantly be obtained only by conducting such a continuous press drawing work. As a result of further investigations, the present inventors have attributed the following fact to a failure to obtain the desired magnetic flux density $B_{4000}$.

Explanation will be made, referring to FIG. 6, which shows a relationship between a degree of working in working steps and a working temperature of the metallic member under plastic working.

Once a strain is given to the metallic member, the working temperature of the member under plastic working will readily reach the Md point, a limit temperature for the transformation of austenite structure showing non-magnetic properties to martensite structure showing ferromagnetic properties due to heat generation during the plastic working. The present inventors have found that the further working over a point X corresponding to the Md point will be an over-working $\alpha$ that gives a strain that does not contribute any more to the generation of martensite structure, and thus working only up to the point X can give an effective strain, though the over working $\alpha$ has a possibility for ferromagnetization.

Thus, the present inventors have conceived that the above-mentioned problem can be solved by giving a strain divisionally, thereby suppressing or reducing the heat generation during the working to a minimum, and that further ferromagnetization can be attained by cooling the member to not more than the room temperature to remove the heat generated during the divisional plastic working in advance to a succeeding divisional working step and then conducting the succeeding plastic working step to give a strain to the member.

That is, by conducting the plastic working such as drawing and ironing in a divisional manner, for example, at as many stages as possible, to obtain a metastable austenite stainless steel structure, it can be optimized to give a strain in the plastic working, as shown by a zigzag line B in FIG. 6, and the heat generation due to the plastic working can be suppressed thereby.

In FIG. 6, the plastic working shown by zigzag line B is conducted by dividing the conventional single working step to three stages ①, ② and ③.

By conducting the plastic working at a plurality of stages in this manner, the plastic working can be performed to the desired final degree of working while maintaining the working temperature below the Md point and thus a satisfactory ferromagnetic property can be given to the member.

Furthermore, the plastic working to give a strain can be carried out after cooling the member in advance. By cooling the member in advances the working temperature of the member can be kept lower than the Md point even at the final degree of working, as shown by line C in FIG. 6, and the ferromagnetization level of the member, for example, $B_{4000}$, can be readily made not less than 0.3 T thereby. That is, the member is cooled to an extremely low temperature such as down to $-196°$ C. to improve the ferromagnetization level and remove the heat generated during the plastic working. By this cooling treatment, the target ferromagnetization level such as a magnetic flux density $B_{4000}$ of not less than 0.3 T can be attained without any increased number of working stages, that is, with a higher working efficiency. The working temperature of the member at the individual working stages should be not more than 100° C. for the following reasons.

FIG. 7 shows a relationship between a working temperature of metallic member and a martensite proportion (%).

The present inventors investigated a relationship between a strain-giving rate and an increase in the working temperature of the member by tension tests. Then, the present inventors conducted a tension test of metastable austenite stainless steel in a thermostat tank at a strain-giving rate of 1 mm/min at which the heat generation due to the plastic working could be disregarded. As a result, it was found that the no more martensite structure was generated at 100° C. or higher, as shown in FIG. 7. That is, the proportion of generated martensite structure is 10% or less at 100° C. or higher. Thus, the desired magnetic characteristics could be obtained by using a working temperature of not more than 100° C. in the plastic working of the member.

The present inventors have made further studies and have found that stress corrosion cracking can be prevented by applying an ironing work of 10% or more to the metallic member after the drawing work.

FIG. 8 shows a relationship between a degree of ironing work and changes in residual stress.

The main factor for causing stress corrosion crackings is said to be a residual tensile stress occurring along the circumferential direction (see FIG. 9), generated by the drawing work, and the residual tensile stress can be considerably reduced by the ironing work. As shown in FIG. 8, the residual stress can enter into a region causing no more residual stress cracking at a degree of ironing work of 10%, and can be completely changed in a residual compression strain, contrary to expectation, at a degree of ironing work of 20% or more. Samples of an ironed member were evaluated by dipping in an aqueous 42% magnesium chloride solution. It was found by this test that no stress corrosion cracking occurred on the samples subjected to ironing work with a degree of ironing work of 10% or more as shown in Table 1. The ironing work is also a very effective means for giving a strain to attain ferromagnetization, and thus is one of the steps for ferromagnetization.

TABLE 1

| Degree of ironing | 0 | 5 | 10 | 20 | 30 | 40 | 50 |
|---|---|---|---|---|---|---|---|
| Stress corrosion cracking | occurred | occurred | non | non | non | non | non |

In summary, according to a first aspect of the present invention there is provided a composite magnetic member which comprises a metallic member comprising not more than 0.6% C, 12 to 19% Cr, 6 to 12% Ni, not more than 2% Mn, not more than 2% Mo, not more than 1% Nb, and the balance being Fe and inevitable impurities, where Hirayama's equivalent H eq=[Ni %]+1.05 [Mn %]+0.65 [Cr %]+0.35 [Si %]+12.6 [C %] is 20 to 23%;

Nickel equivalent Ni eq=[Ni %]+30 [C %]+0.5 [Mn %] is 9 to 12%, and

Chromium equivalent Cr eq=[Cr %]+[Mo %]+1.5 [Si %]+0.5 [Nb %] is 16 to 19, wherein % is by weight, the metallic member being ferromagnetized by cold working, part of the ferromagnetized member being made by local solid-solution treatment to have crystal grain sizes of not more than 30 μm, thereby making the locally non-magnetized part have a relative magnetic permeability μ of not more than 1.2 at a temperature as low as −40° C.

It is preferable, after the ferromagnetization by cold working or after local non-magnetization of part of the ferromagnetized member by local heating, to further conduct a stress relieving annealing at a temperature of not higher than 500° C. By conducting the stress relieving annealing, the ferromagnetization can be further intensified. The stress relieving annealing is a treatment to improve the magnetic characteristics by removing plastic strains given to the member by cold working.

According to a second aspect of the present invention, there is provided a process for producing a composite magnetic member, which comprises ferromagnetizing a metallic member comprising not more than 0.6% C, 12 to 19% Cr, 6 to 12% Ni, not more than 2% Mn, not more than 2% Mo, not more than 1% Nb, and the balance being Fe and inevitable impurities, where Hirayama's equivalent H eq=[Ni %]+1.05 [Mn %]+0.65 [Cr %]+0.35 [Si %]+12.6 [C %] is 20 to 23%;

Nickel equivalent Ni eq=[Ni %]+30 [C %]+0.5 [Mn %] is 9 to 12%, and

Chromium equivalent Cr eq=[Cr %]+[Mo %]+1.5 [Si %]+0.5 [Nb %] is 16 to 19%, wherein % is by weight, by cold working, and then subjecting part of the ferromagnetized member to local solid-solution treatment within 10 seconds without melting the part, thereby making crystal grain sizes of the part not more than 30 μm and making the thus no-magnetized part have a relative magnetic permeability μ of not more than 1.2 at a temperature as low as −40° C. It is preferable to conduct the solid-solubilization treatment within 2 seconds.

According to a third aspect of the present invention there is provided a process for producing a composite magnetic member, which comprises subjecting a metallic member comprising not more than 0.6% C, 12 to 19% Cr. 6 to 12% Ni, not more than 2% Mn, not more than 2% Mo, not more than 1% Nb, and the balance being Fe and inevitable impurities, where Hirayama's equivalent H eq=[Ni %]+1.05 [Mn %]+0.65 [Cr %]+0.35 [Si %]+12.6 [C %] is 20 to 23%;

Nickel equivalent Ni eq=[Ni %]+30 [C %]+0.5 [Mn %] is 9 to 12%, and

Chromium equivalent Cr eq=[Cr %]+[Mo %]+1.5 [Si %]+0.5 [Nb %] is 16 to 19%, wherein % is by weight, to a drawing step and an ironing step, thereby ferromagnetizing the member, and then non-magnetizing part of the ferromagnetized member, thereby making the non-magnetized part have a relative magnetic permeability μ not more than 1.2 at a temperature as low as −40° C.

According to a fourth aspect of the present invention, there is provided a process for producing a composite magnetic member, which comprises subjecting a metallic member comprising not more than 0.6% C, 12 to 19% Cr, 6 to 12% Ni, not more than 2% Mn, not more than 2% Mo, not more than 1% Nb, and the balance being Fe and inevitable impurities, where Hirayama's equivalent H eq=[Ni %]+1.05 [Mn %]+0.65 [Cr %]+0.35 [Si %]+12.6 [C %] is 20 to 23%;

Nickel equivalent Ni eq=[Ni %]+30 [C %]+0.5 [Mn %] is 9 to 12%, and

Chromium equivalent Cr eq=[Cr %]+[Mo %]+1.5 [Si %]+0.5 [Nb %] is 16 to 19%, wherein % is by weight, to a strain-giving working step at a plurality of stages while controlling the working temperature of the individual working stages to not more than 100° C., thereby making the member into a ferromagnetized member having a magnetic flux density $B_{4000}$ of not less than 0.3 T, and then subjecting part of the ferromagnetized member to local solid-solution treatment within 10 seconds, thereby making crystal grain sizes of the solid-solution-treated part not more than 30 μm.

According to a fifth aspect of the present invention, there is provided a process for producing a composite magnetic member, which comprises cooling a metallic member comprising not more than 0.6% C, 12 to 19% Cr, 6 to 12% Ni, not more than 2% Mn, not more than 2% Mo, not more than 1% Nb, and the balance being Fe and inevitable impurities, where Hirayama's equivalent H eq=[Ni %]+1.05 [Mn %]+0.65 [Cr %]+0.35 [Si %]+12.6 [C %] is 20 to 23%;

Nickel equivalent Ni eq=[Ni %]+30 [C %]+0.5 [Mn %] is 9 to 12%, and

Chromium equivalent Cr eq=[Cr %]+[Mo %]+1.5 [Si %]+0.5 [Nb %] is 16 to 19%, wherein % is by weight, to a temperature of not more than room temperature, then subjecting the member to a strain-giving working step, while controlling working temperature to not more than 100° C., thereby making the member into a ferromagnetized member having a magnetic flux density $B_{4000}$ of not less than 0.3 T, and subjecting part of the ferromagnetized member to local solid-solution treatment within 10 seconds, thereby making crystal grain sizes of the solid-solution-treated part not more than 30 μm.

According to a sixth aspect of the present invention, there is provided a process for producing a composite magnetic member, which comprises subjecting a metallic member comprising not more than 0.6% C, 12 to 19% Cr, 6 to 12% Ni, not more than 2% Mn, not more than 2% Mo, not more than 1% Nb, and the balance being Fe and inevitable impurities, where Hirayama's equivalent H eq=[Ni %]+1.05 [Mn %]+0.65 [Cr %]+0.35 [Si %]+12.6 [C %] is 20 to 23%;

Nickel equivalent Ni eq=[Ni %]+30 [C %]+0.5 [Mn %] is 9 to 12%, and

Chromium equivalent Cr eq=[Cr %]+[Mo %]+1.5 [Si %]+0.5 [Nb %] is 16 to 19%, wherein % is by weight, to a strain-giving working step at a plurality of stages while controlling the working temperature of the individual working stages to not more than 100° C., then subjecting the member to an ironing work at a degree of ironing of not less than 10%, thereby making the member into a ferromagnetized member having a magnetic flux density $B_{4000}$ of not less than 0.3 T, and then subjecting part of the ferromagnetized member to local solid-solution treatment within 10 seconds, thereby making the locally solid-solution-treated part have crystal grain sizes of not more than 30 μm.

After the solid-solution treatment, the resulting member may be subjected to hot working at a temperature of not less than 100° C., thereby forming the member into a desired shape.

According to a seventh aspect of the present invention there is provided an electromagnetic valve, which comprises a movable iron core provided slidably in a magnetic circuit formed by excitation of a coil, the movable iron core being adopted to open or shut a fluid passage by sliding caused by the excitation of the coil, and a support member with a slide hole through which the movable iron core is inserted slidably, at least one part of the support member being provided in the magnetic circuit, the support member being made from a metallic member comprising at least one ferromagnetized part and at least one non-magnetized part, as continuously and integrally formed, the non-magnetized part having a span of not less than 1 mm wide.

According to an eighth aspect of the present invention there is provided an electromagnetic valve, which comprises a movable iron core provided slidably in a magnetic circuit formed by excitation of a coil, the movable iron core being adapted to open or shut a fluid passage by sliding caused by the excitation of the coil, and a support member with a hole through which the movable iron core is inserted slidably, at least one part of the support member being provided in the magnetic circuit, the support member being made from a metallic member comprising at least one ferromagnetized part and at least one non-magnetized part, as continuously and integrally formed, and the non-magnetized part surrounding at least the lower end of the movable iron core.

In the first to third aspects of the present invention a remarkable composite magnetic member, whose non-magnetized part is never converted to a ferromagnetized part, even when exposed to a severe temperature condition, can be provided on the basis of the novel findings shown in FIGS. 1 to 5.

In the first to sixth aspects of the present invention a composite magnetic member having at least one ferromagnetized part and at least one non-magnetized part, as continuously and integrally formed, can be produced quite easily, on the basis of the novel findings shown in FIGS. 1 to 8.

In the seventh aspect of the present invention, a support member having at least one ferromagnetized part and at least one non-magnetized part, as continuously and integrally formed, is used in an electromagnetic valve and a movable iron core can be stably driven by using the non-magnetized part having a span of not less than 1 mm wide.

In the eighth aspect of the present invention the support member, whose non-magnetized part is made to surround the lower end of the movable iron core, is provided and thus the movable iron core can be more stably driven.

DETAILED DESCRIPTION OF THE PREFERRED EMBODIMENT

EXAMPLES 1 TO 4

Alloys of compositions shown in the following Table 2 as Examples 1 to 4 were melted in a vacuum induction furnace and each formed into disk plates 1, 1.0 mm thick, by casting and rolling, and the disk plates 1 were annealed into a softened state at 1,000° C. in a heating furnace.

TABLE 2

| Example | Chemical composition (wt %) | | | | | | Ni eq | Cr eq | H eq |
| --- | --- | --- | --- | --- | --- | --- | --- | --- | --- |
| | C | Si | Mn | Ni | Cr | Fe | | | |
| 1 | 0.030 | 0.35 | 0.47 | 8.50 | 17.38 | balance | 9.66 | 17.91 | 20.79 |
| 2 | 0.030 | 0.35 | 0.51 | 10.15 | 15.52 | " | 11.35 | 16.05 | 21.31 |
| 3 | 0.028 | 0.38 | 0.51 | 9.55 | 17.30 | " | 10.65 | 17.87 | 21.82 |
| 4 | 0.028 | 0.38 | 0.51 | 10.62 | 17.29 | " | 11.72 | 17.86 | 22.88 |

Figure 1:
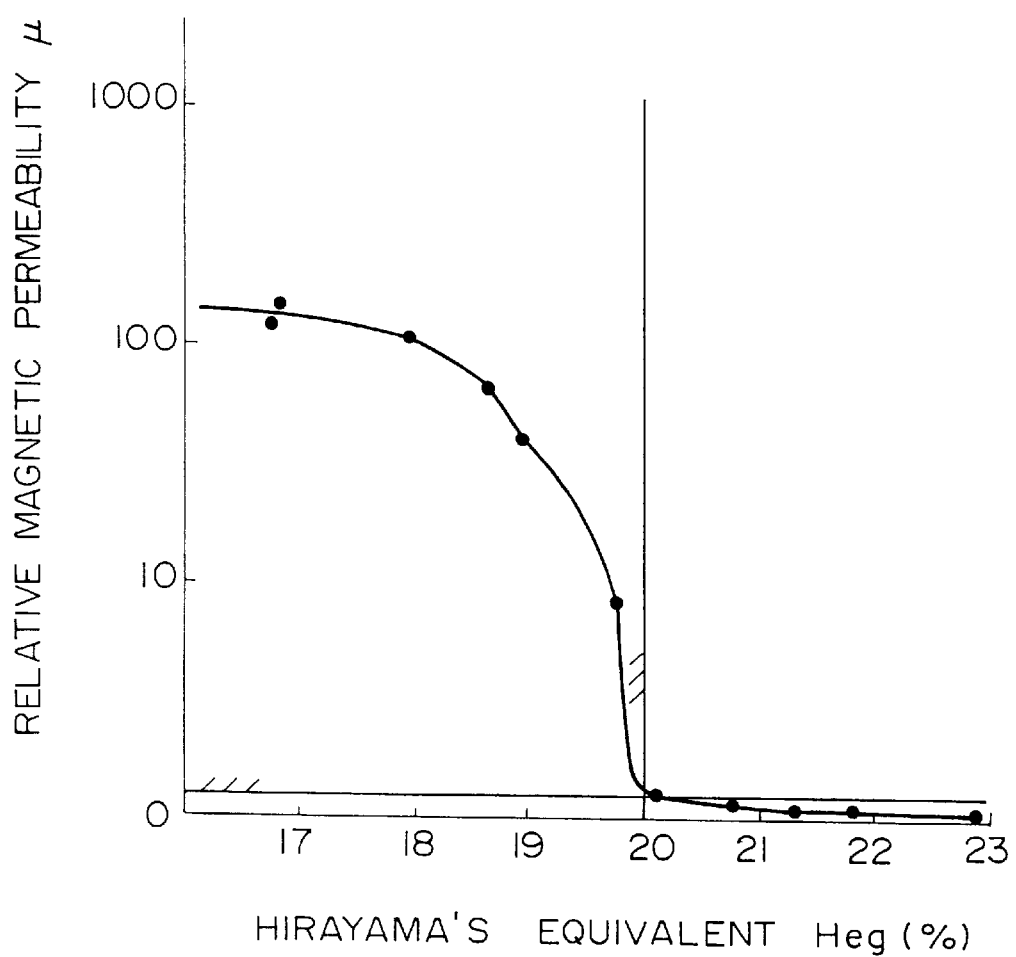
FIG. 1 is a characteristic diagram showing a relationship between a Hirayama's equivalent H eq and a relative magnetic permeability μ.
Figure 2:
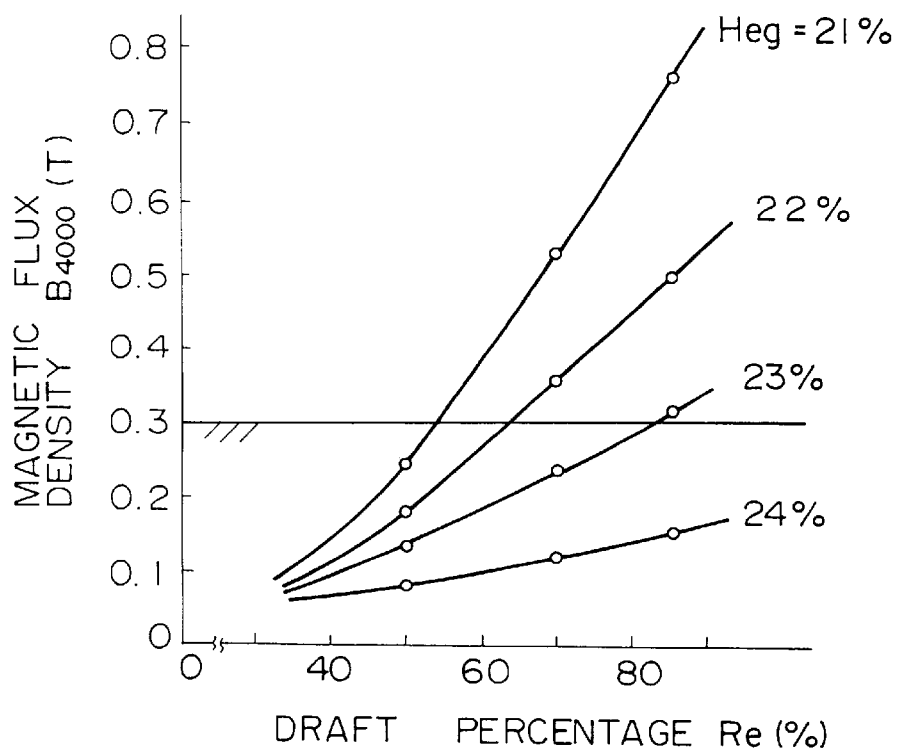
FIG. 2 is a characteristic diagram showing a relationship between a draft percentage and a magnetic flux density μ.
Figure 3:
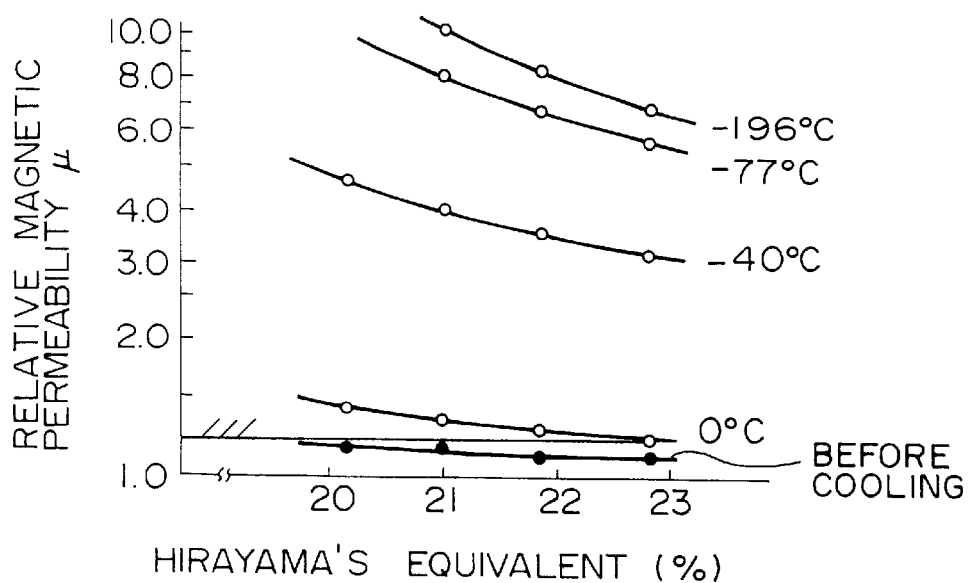
FIG. 3 is a characteristic diagram showing a relationship between a Hirayama's equivalent H eq and a relative magnetic permeability μ at various temperatures.
Figure 4:
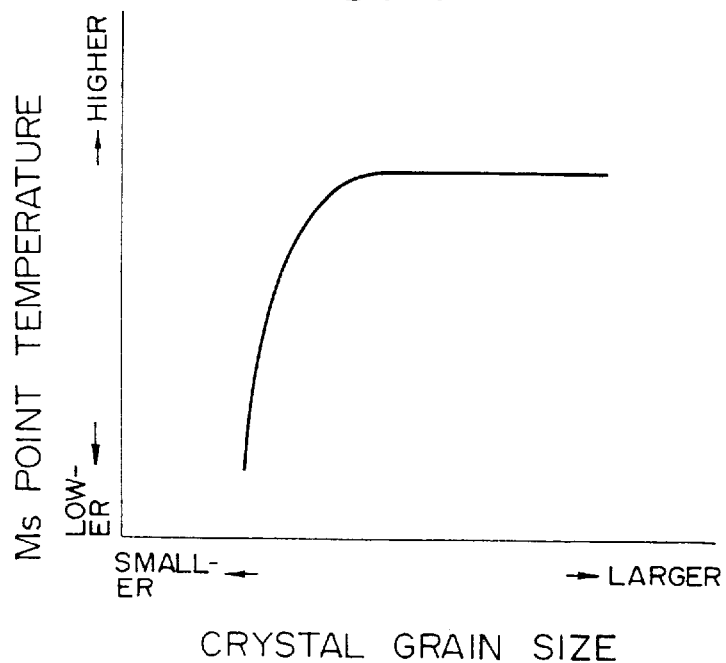
FIG. 4 is a conceptual diagram showing a relationship between a crystal grain size and temperatures at which transformation to a martensite structure takes place.
Figure 5:
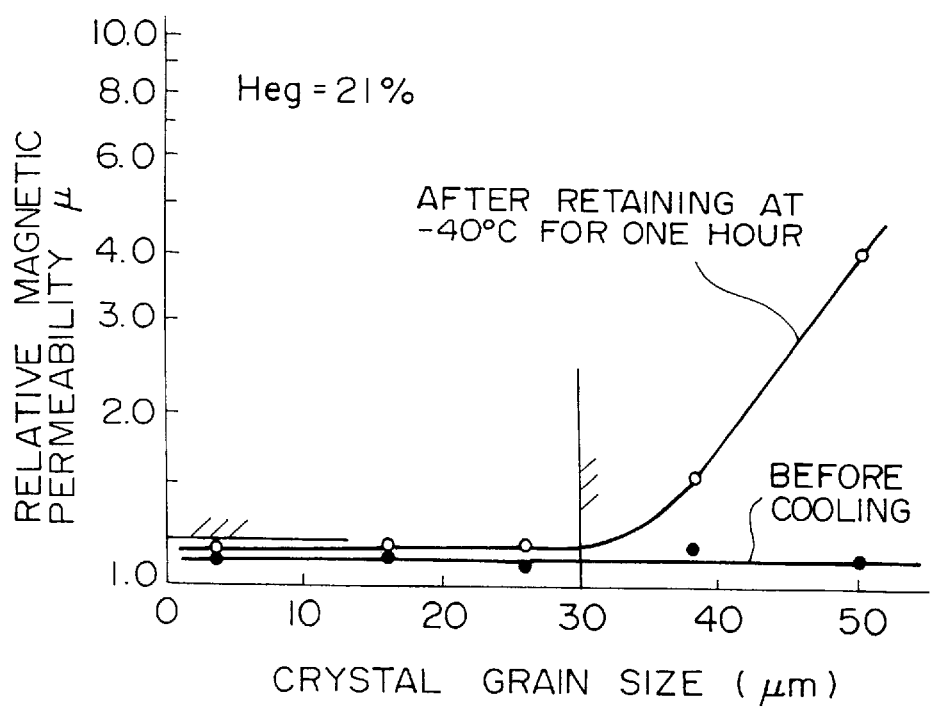
FIG. 5 is a diagram showing changes in a relative magnetic permeability of metallic member before cooling and after having been cooled to and retained at −40° C. for one hour.
Figure 6:
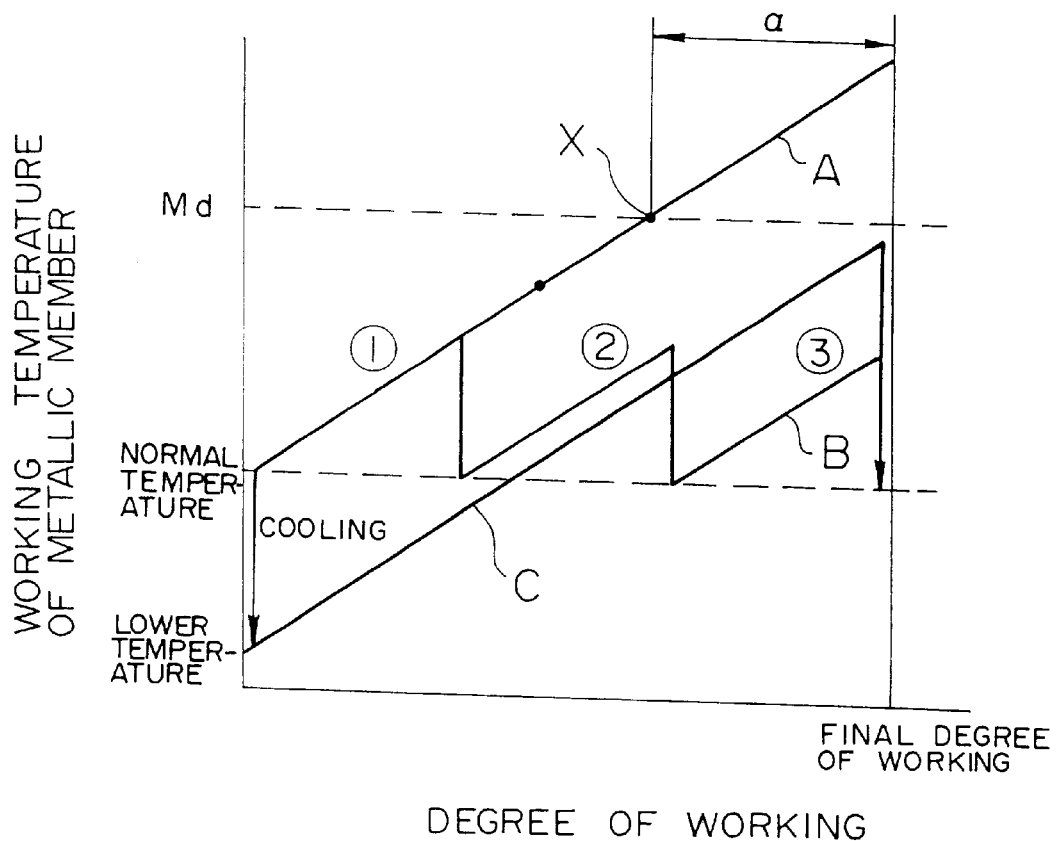
FIG. 6 is a characteristic diagram showing a relationship between a degree of working in working step and a working temperature of metallic member under plastic working.
Figure 7:
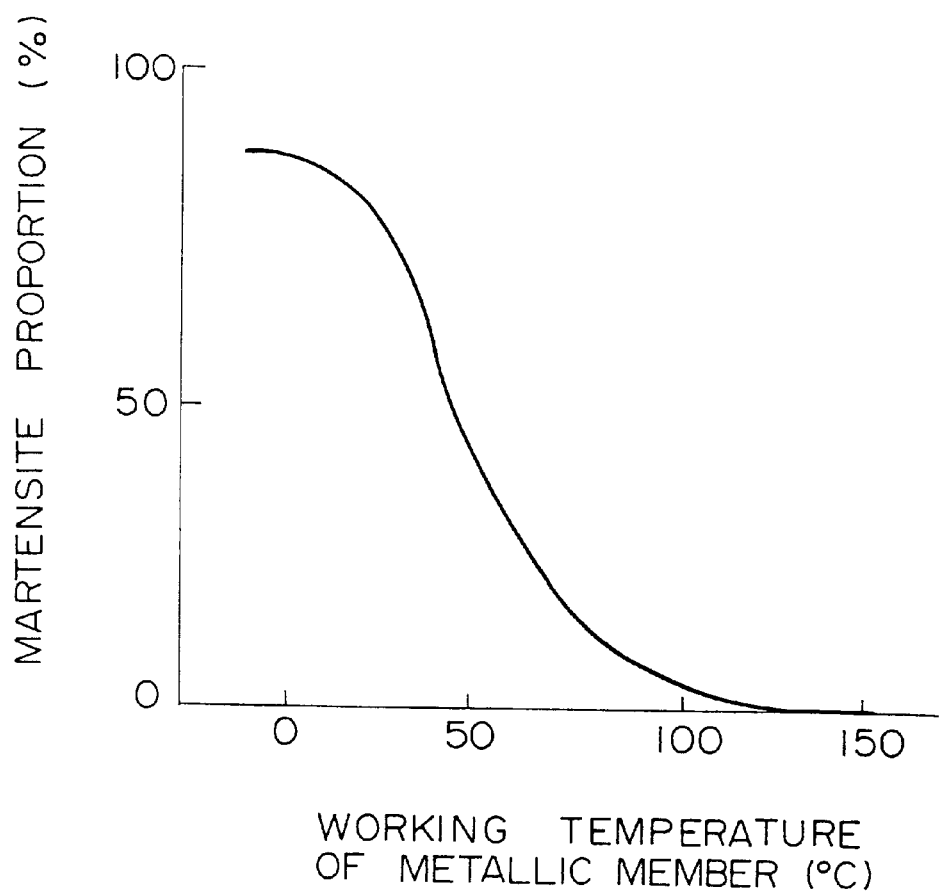
FIG. 7 is a diagram showing a relationship between a working temperature of metallic member and a martensite proportion (%).
Figure 8:
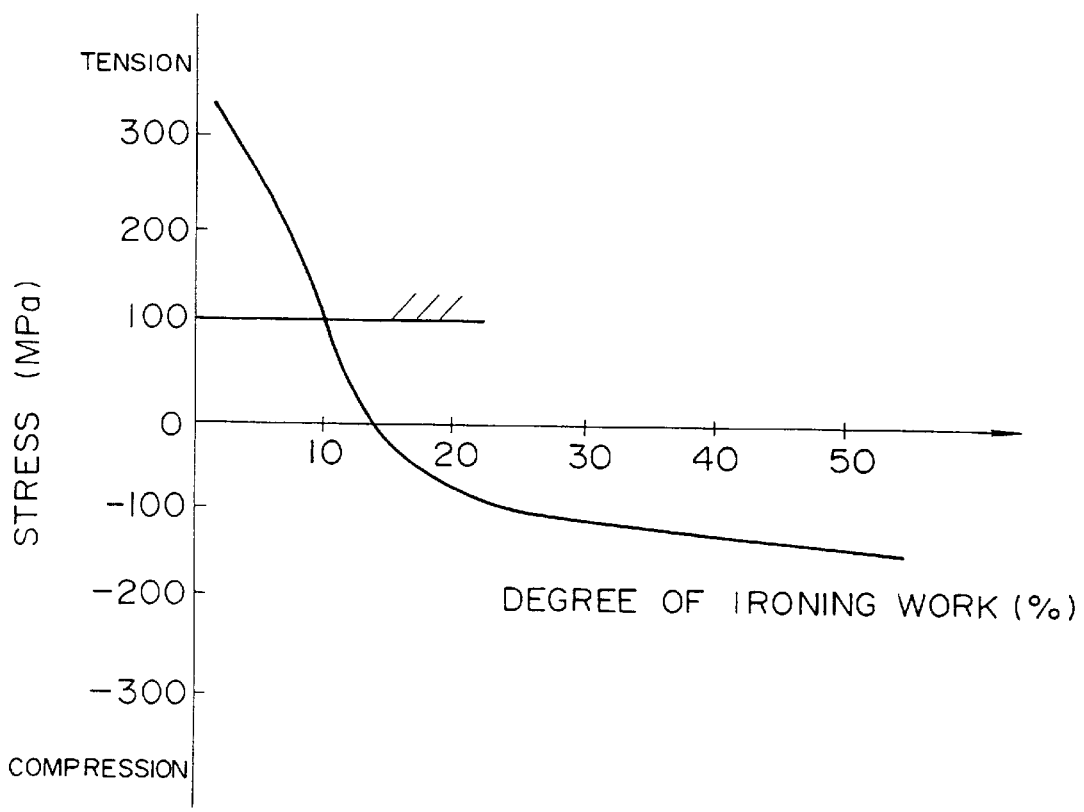
FIG. 8 is a characteristic diagram showing a relationship between a degree of ironing work and changes in residual stress.
Figure 9:
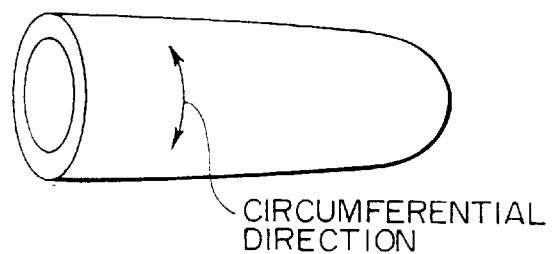
FIG. 9 is a view showing the circumferential direction along which a residual tensile stress occurs.
Figure 10A:
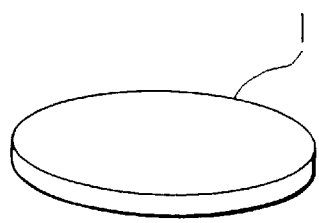
FIGS. 10A to 10F show steps for producing the present composite magnetic member.
Figure 10B:
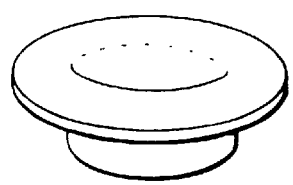
Figure 10C:
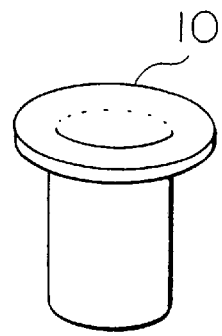
Figure 10D:
Figure 10E:
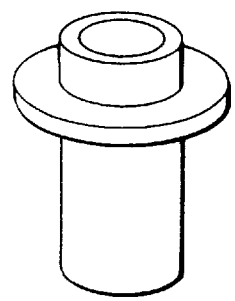
Figure 10F:
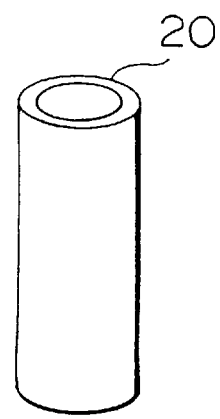

The disk plates 1 of alloys of Examples 1 to 4 thus prepared were subjected to stagewise drawing work at room temperature through the shape shown in FIG. 10B, while preventing an increase in the working temperature to obtain cup shapes 10 having a good ferromagnetic property, as shown in FIG. 10C. Then, by further ironing work through shapes shown in FIGS. 10D and 10E to attain a degree of ironing (=t−t'/t×100) of 30% or more, where t is thickness of a disk plate before the ironing and t' is that thereafter, desired cylinders 20 having a ferromagnetic property throughout were obtained, as shown in FIG. 10F.

Degree of ferromagnetization by martensitization of austenite structure largely depends not only on the degree of working, but also on the working temperature, and further ferromagnetization can be attained by controlling the working temperature.

Figure 11A:
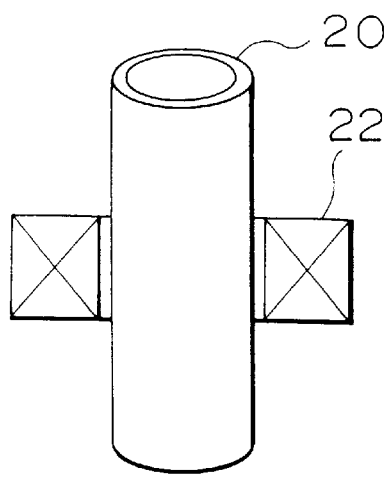
FIGS. 11A and 11B show steps for producing the present composite magnetic member.

In the present invention, the following procedure was employed for local solid-solution treatment. That is, a high frequency coil 22 was provided to surround the middle part of the ferromagnetized cylinder 20, as shown in FIG. 11A, and part of the cylinder 20 was locally heated and cooled by a cooling liquid at a temperature of about 20° C., thereby non-magnetizing the part. The following high frequency heating conditions were employed:

Frequency: 100 kHz
Plate voltage: 6 kV
Plate current: 2.1 A
Heating time: 0.8 sec The high frequency heating was employed as a heating means for a non-magnetizing part of the cylinder 20 on the following grounds:

Heretofore, part of the martensite region (ferromagnetized region) has been subjected to local solid-solution treatment to convert it to an austenite region (non-magnetized region). For the local solid-solution treatment of the ferromagnetized region, a high energy beam such as a laser, an electron beam, etc. has been used. In order to form the non-magnetized region to a sufficient depth, the crystal grains having strains due to cold working have been once melted by hitting the surface of the ferromagnetized region with a high energy beam and immediately cooled to form a solidification structure, thereby non-magnetizing the ferromagnetized region. However, it has been difficult to make the non-magnetized region have a desired relative magnetic permeability $\mu$ of not more than 1.2 because of generation of $\delta$ ferrite peculiar to the solidification structure and enlarged crystal grains in the heat-influenced region near the molten part by the high energy beam, etc. Thus, it has been heretofore very difficult to obtain a non-magnetized region having a relative magnetic permeability $\mu$ of not more than 1.2 to a sufficient depth. Thus, high frequency heating is employed in the present invention.

Since the high frequency heating uses an eddy current locally generated in the member by high frequency current as a heating source, not only solid-solution treatment can be carried out very simply within a short time without any local melting by properly controlling the coil shape, frequency, current voltage, etc., but also crystal grain size can be prevented from enlargement because of a short heating time such as a few seconds.

Figure 11B:
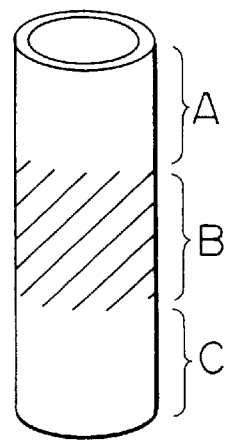

The cylinder 20 was magnetically sectioned into, for example, three regions A, B and C, as shown in FIG. 11B, by the above-mentioned local high frequency heating and cooling, where the regions A and C had ferromagnetic characteristics, whereas the region B therebetween had non-magnetic characteristics.

Test pieces for determining magnetic characteristics were sampled from the ferromagnetized regions A and C and also from the non-magnetized region B of the thus obtained cylinders of Examples 1 to 4, and subjected to determination of magnetic characteristics by a DC magnetic fluxmeter or by a permeameter. The results are shown in the following Table 3, and it was found that composite magnetic members having desired magnetic characteristics and crystal grain sizes of not more than 30 $\mu$m as conditions for retaining the non-magnetic property at an extremely low temperature were obtained thereby.

TABLE 3

| Example | Magnetic flux density of ferro-magnetized region $B_{4000}$ (T) | Relative magnetic permeability of non-magnetized region $\mu$ | Crystal grain size of non-magnetized region $\mu$m |
| --- | --- | --- | --- |
| 1 | 0.75 | 1.14 | 14 |
| 2 | 0.52 | 1.06 | 10 |
| 3 | 0.44 | 1.06 | 12 |
| 4 | 0.33 | 1.03 | 11 |

EXAMPLE 5

Figure 12:
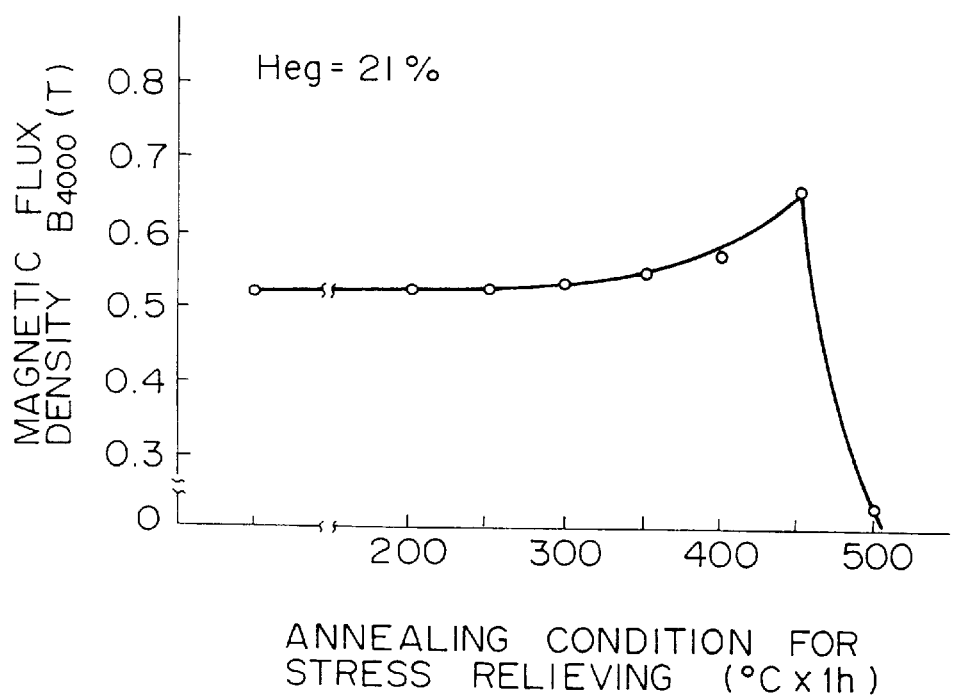
FIG. 12 is a diagram showing a relationship between annealing condition for stress relieving and magnetic flux density.

In Example 5, stress relieving annealing was further carried out at 500° C. or temperatures below 500° C. on the cylinder 20 of Example 2 after the above-mentioned cold working to attain further ferromagnetization. FIG. 12 shows changes in the magnetic characteristics of the cylinder of Example 2, when the cylinder was subjected to stress relieving annealing at 500° C. or temperatures below 500° C.

As is apparent from FIG. 12, the magnetic characteristics can be increased with increasing annealing temperature and the maximum magnetic characteristics can be obtained at 450° C. with air colling.

The foregoing Examples 1 to 4 show an example of cup-shaped members, but the present invention is not limited thereto. That is, a pipe-shaped member can be made from the present metallic member composition for the present composite magnetic member and ferromagnetized by cold working such as drawing, etc., and the resulting ferromagnetized member can be locally non-magnetized by high frequency heating, or a plate-shaped member can be prepared from the present metallic member composition for the present composite magnetic member, ferromagnetized by cold working such as rolling, etc., and the resulting ferromagnetized member can be locally non-magnetized by high frequency heating.

In the foregoing Examples 1 to 4, high frequency heating was employed for a local solid-solution treatment, but the present invention is not limited thereto. That is, any procedure for heating only part of the ferromagnetized member to be non-magnetized within a short time without melting it can be employed in the present invention.

In Example 5 maximum magnetic characteristics could be obtained at an annealing temperature of 450° C., but the present invention is not limited thereto. That is, when the metallic member composition and cold working conditions are changed, an annealing temperature capable of obtaining optimum magnetic characteristics will change in a temperature range of not more 500° C.

EXAMPLES 6 TO 13

Figure 13A:
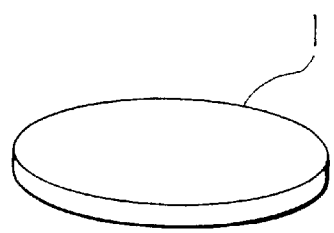
FIGS. 13A to 13F show steps for producing the present composite magnetic member.

Alloys of compositions shown in the following Table 4 as Examples 6 to 13 were melted in a vacuum induction furnace and each formed into disk plates 1, 1.2 mm thick, by casting and rolling as shown in FIG. 13A, and the disk plates 1 were annealed into a softened state by heating at 950° C.

TABLE 4

| | Chemical composition (wt %) | | | | | | | | | |
|---|---|---|---|---|---|---|---|---|---|---|
| Example | C | Si | Mn | Ni | Cr | Fe | Mo | Nb | Ni eq | Cr eq | H eq |
| 6 | 0.030 | 0.35 | 0.47 | 8.50 | 17.38 | balance | — | — | 9.66 | 17.91 | 20.79 |
| 7 | 0.030 | 0.35 | 0.51 | 10.15 | 15.52 | " | — | — | 11.35 | 16.05 | 21.31 |
| 8 | 0.028 | 0.38 | 0.51 | 9.55 | 17.30 | " | — | — | 10.65 | 17.87 | 21.82 |
| 9 | 0.028 | 0.38 | 0.51 | 10.62 | 17.29 | " | — | — | 11.72 | 17.86 | 22.88 |
| 10 | 0.046 | 0.41 | 0.60 | 8.38 | 18.01 | " | — | 0.32 | 10.06 | 18.78 | 21.43 |
| 11 | 0.052 | 0.33 | 1.03 | 8.22 | 17.09 | " | — | 0.76 | 10.29 | 18.06 | 21.24 |
| 12 | 0.029 | 0.18 | 0.43 | 8.25 | 17.65 | " | 0.51 | — | 9.8 | 18.4 | 20.6 |
| 13 | 0.030 | 0.19 | 0.43 | 8.35 | 16.91 | " | 1.03 | — | 10.1 | 18.2 | 20.2 |

Figure 13B:
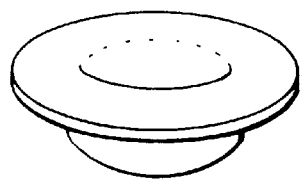
Figure 13C:
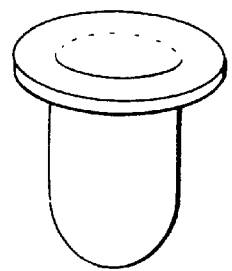
Figure 13D:
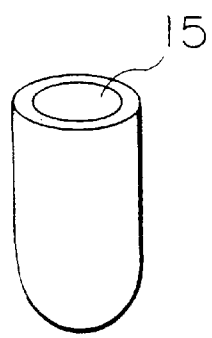
Figure 13E:
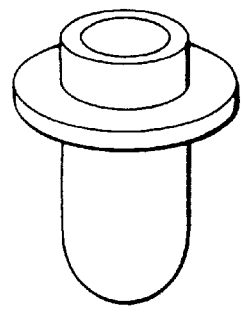
Figure 13F:
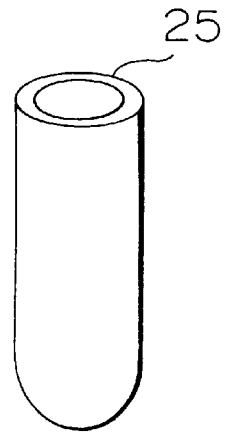

The disk plates 1 of alloys of Examples 6 to 9 thus prepared were subjected to stagewise drawing work at room temperature through the shape shown in FIG. 13B to obtain cup shapes 15, as shown in FIG. 13C. The stagewise drawing of the disk plates 1 was carried out at 7 stages to prevent an increase in the working temperature and obtain a good ferromagnetic property, while keeping the working temperature of the disk plates 1 below 100° C., thereby obtaining the cup-shapes 15. Then, by further ironing works through shapes, as shown in FIGS. 13D and 13E, to attain a degree of ironing (=t−t'/t×100) of 10% or more, where t is thickness of a disk plate before the ironing and t' is that thereafter, desired cylinders 25 having a ferromagnetic property throughout were obtained, as shown in FIG. 13F.

Degree of ferromagnetization by martensitization of austenite structure largely depends not only on the degree of working, but also on the working temperature, and further ferromagnetization can be attained by controlling the working temperature.

When the members of the compositions shown in Table 4 are worked into cup shapes only by drawing, there is a fear of stress corrosion cracking or season cracking due to residual stress. However, in these Examples 6 to 13, the residual stress can be reduced and the reduced residual stress can be converted from compression stress to tensile stress in the member by further ironing work. Thus, the stress corrosion cracking, etc. due to the residual stress, etc. can be prevented thereby.

Figure 14A:
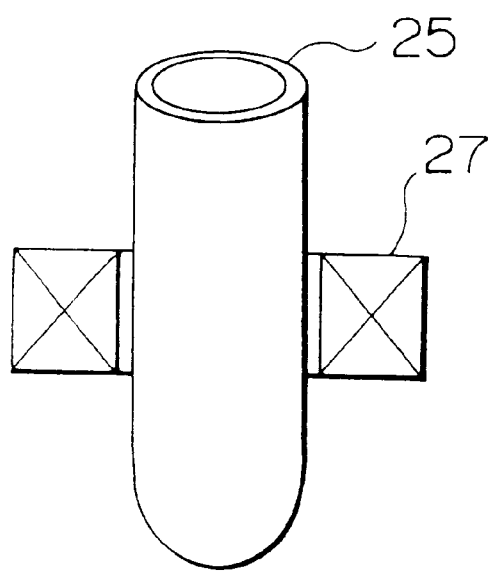
FIGS. 14A and 14B show steps for producing the present composite magnetic member.

In the present invention, the following procedure was employed for local solid-solution treatment. That is, a high frequency coil 27 was provided to surround the middle part of the ferromagnetized cylinder 25, as shown in FIG. 14A, and part of the cylinder 25 was locally heated and cooled by a cooling liquid at a temperature of about 20° C., thereby non-magnetizing the part. The following high frequency heating conditions were employed:

Frequency: 100 kHz
Plate voltage: 6 kV
Plate current: 2.1 A
Heating time: 0.8 sec Since the high frequency heating uses an eddy current locally generated in the member by high frequency current as a heating source, not only solid-solution treatment can be carried out very simply within a short time without any local melting by properly controlling the coil shape, frequency, current voltage, etc., but also crystal grain size can be prevented from enlargement because of a short heating time such as a few seconds.

Figure 14B:
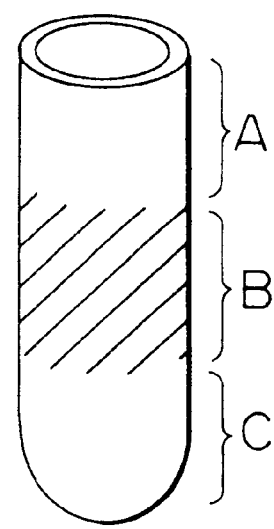

The cylinder 25 was magnetically sectioned into, for example, three regions A, B and C, as shown in FIG. 14B, by the above-mentioned local high frequency heating and cooling, where the regions A and C had ferromagnetic characteristics, whereas the region B therebetween had non-magnetic characteristics.

Test pieces for determining magnetic characteristics were sampled from the ferromagnetized regions A and B and also from the non-magnetized region B of the thus obtained cylinders of Examples 6 to 13, and subjected to determination of magnetic characteristics by a DC magnetic fluxmeter or by a permeameter. The are shown in the following Table 5, and it was found that compound magnetic members having desired magnetic characteristics and crystal grain sizes of not more than 30 μm as conditions for retaining the non-magnetic property at an extremely low temperature could be obtained.

TABLE 5

| Example | Magnetic flux density of ferro-magnetized region $B_{4000}$ (T) | Relative magnetic permeability of non-magnetized region μ | Crystal grain size of non-magnetized region μm |
|---|---|---|---|
| 6 | 0.85 | 1.10 | 3 |
| 7 | 0.62 | 1.06 | 3 |
| 8 | 0.53 | 1.06 | 2 |
| 9 | 0.38 | 1.03 | 2 |
| 10 | 0.58 | 1.05 | 3 |
| 11 | 0.69 | 1.09 | 3 |
| 12 | 0.68 | 1.05 | 3 |
| 13 | 0.54 | 1.06 | 3 |

In the foregoing Examples 6 to 13, high frequency heating was employed for local solid-solution treatment, but the present invention is not limited thereto. That is, any procedure for heating only part of the ferromagnetized member to be non-magnetized within a short time without melting it can be employed in the present invention.

EXAMPLES 14 AND 15

In these Examples 14 and 15 cooling was conducted before giving a strain to the alloy. The alloy used in these Examples 14 and 15 was the alloy having the same composition as that of Example 6.

That is, the alloy of the same composition as in Example 6 was melted in a vacuum induction furnace and formed into disk plates 1, 1.2 mm thick, as shown in FIG. 13A, by casting and rolling, and the disk plates 1 were annealed to a softened state by heating at 950° C.

The thus prepared disk plates were cooled to −77° C. by dipping the disk plates into a liquid methanol cooled to −77° C. by adding thereto dry ice in Example 14, whereas the other disk plates were cooled to −196° C. by dipping the disk plates into a liquefied nitrogen in Example 15.

Then, the disk plates thus prepared were subjected to stagewise drawing work at room temperature through the shape shown in FIG. 13B to obtain cup shapes 15, as shown in FIG. 13C. That is, the stagewise drawing was carried out at three stages to prevent an increase in the working temperature, while keeping the working temperature of the disk plate 1 below 100° C., thereby obtaining the cup shapes 15. Then, by further ironing work through shapes, as shown in FIGS. 13D and 13E, to attain a degree of ironing (=t−t'/t×100) of 30% or more, where t is thickness of a disk plate before the ironing and t' is that thereafter, desired cylinders 25 having a ferromagnetic property throughout were obtained, as shown in FIG. 13F.

Then, the thus obtained cylinders were subjected to local high frequency heating and determination of magnetic characteristics in the same manner as in Examples 1 to 4. The results are shown in the following Table 6.

TABLE 6

| Example | Cooling (° C.) | Magnetic flux density of ferro-magnetized region $B_{4000}$ (T) | Relative magnetic permeability of non-magnetized region $\mu$ | Crystal grain size of non-magnetized region $\mu$m |
|---|---|---|---|---|
| 14 | to −77 | 0.92 | 1.10 | 3 |
| 15 | to −196 | 1.18 | 1.09 | 3 |

As is apparent from Table 6, composite magnetic members having a ferromagnetic property can be obtained by cooling the alloy before the drawing, and composite magnetic members having at least one satisfactorily ferromagnetized part and at least one satisfactorily non-magnetized part, as continuously and integrally formed, can be obtained with less working steps by cooling before the strain-giving working.

EXAMPLE 16

In this Example 16, application of the composite magnetic members obtained in the foregoing Examples 1 to 4 to an electromagnetic valve to be employed in automobiles, etc. will be described.

Figure 15:
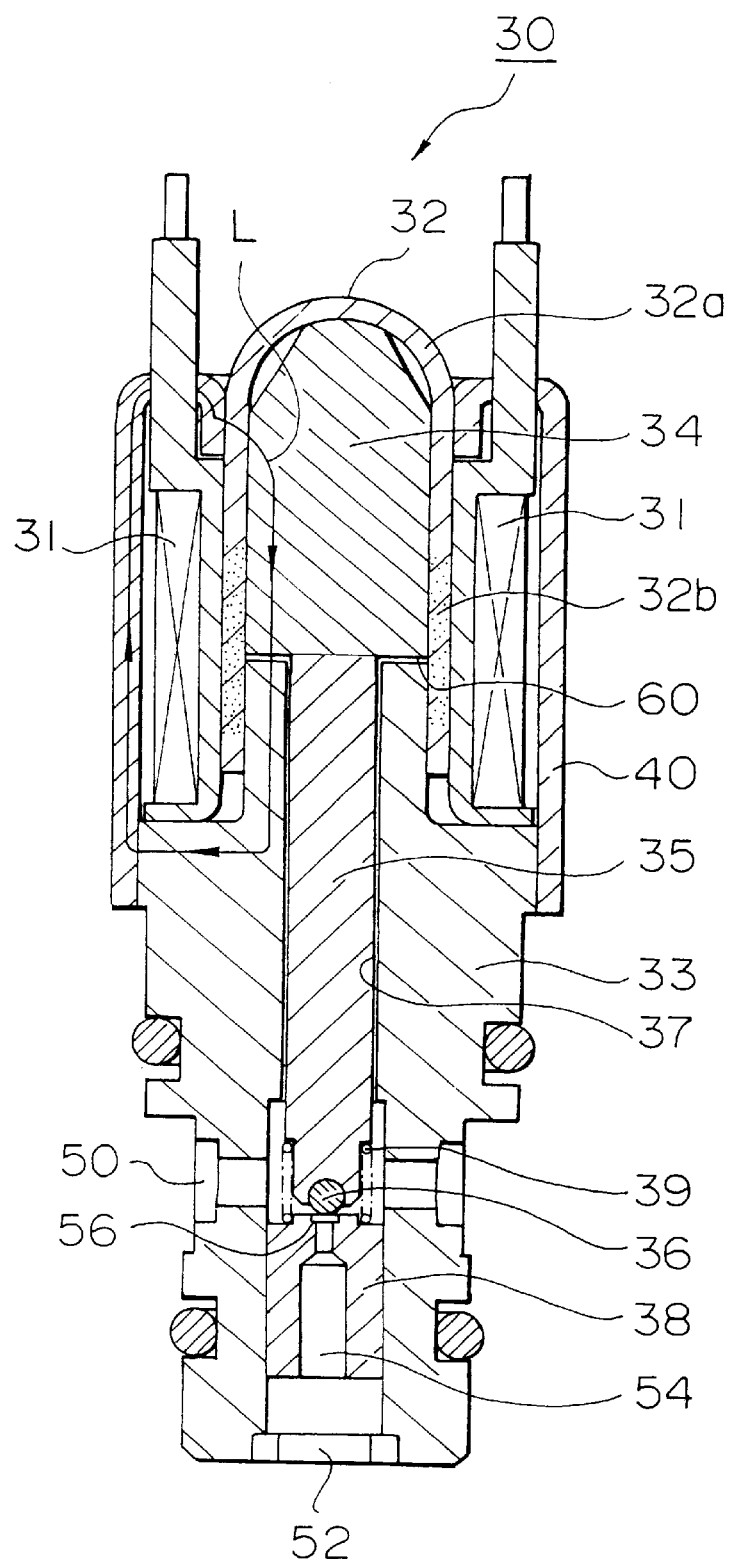
FIG. 15 is a vertical cross-sectional view of an electromagnetic valve using the present composite magnetic member.

FIG. 15 is a vertical cross-sectional view of an electromagnetic valve for closing an oil-hydraulic line, using the present composite magnetic member.

An electromagnetic valve 30 is provided with a cup-shaped sleeve 32 with a ferromagnetized part 32a and a non-magnetized part 32b as continuously and integrally formed by cold working and high frequency heating of alloy of Example 1 as a support member. The sleeve 32 is coaxially with a coil 31. The sleeve 32 is hermetically bonded to a stator 33 as a ferromagnetic core by bonding such as welding, etc. so as to prevent any leakage of an oil-hydraulic fluid.

A plunger 34 as a slidable, movable iron core is inserted into the sleeve 32, and the plunger 34 is hermetically fixed to an upper end of a shaft 35, whereas a ball 36 is fixed to the lower end of the shaft 35. An insertion hole 37 is formed in the stator 33 in the axial direction so that the shaft 35 can slidably move through the insertion hole 37.

At the ball 36-fixing end, i.e. the lower end, of the shaft 35, outflow openings 50 are provided in the radial direction and a seat valve 38 is inserted into the insertion hole 37. A hole 54 communicating an inflow opening 52 with the outflow openings 50 is provided through the seat valve 38. A valve seat 56 is formed on the top end of the seat valve 38. A spring 39 is provided between the seat valve 38 and the shaft 35 against the valve seat 56 to give an expansion force to the shaft 35 in the direction to depart the ball 36 from the valve seat 56. A ferromagnetic yoke 40 is provided contact with the stator 33 and the sleeve 32 so as to cover the outer periphery of the coil 31.

Working of the electromagnetic valve 30, as shown in FIG. 15, will be explained below:

Normally, the shaft 35 and the plunger 34 are pressed to the top end of the sleeve 32 by the expansion force exerted by the spring 39, and the ball 36 is departed from the valve seat 56 thereby. Thus, the inflow opening 52 is communicated with the outflow openings 50 through the communication hole 54 to open the valve, and the oil-hydraulic fluid is passed from the inflow opening 52 to the outflow openings 50.

When it is necessary to close the valve on the other hand, excitation of the coil 31 is made to take place by passing an electric current through the coil 31 and a magnetic circuit is generated in the direction of yoke 40→ferromagnetized part 32a of the sleeve 32→plunger 34→stator 33, as shown by excitation route L as the magnetic circuit, whereby the plunger 34 is attracted downwards in the axial direction to push the shaft 35 to slide through the insertion hole 37. Then, the ball 36 is set onto the valve seat 56 to shut off communication of the inflow opening 52 with the outflow openings 50 and close the valve.

When the valve is to be opened, the electric current to the coil 31 is shut off, thereby decaying the magnetic circuit. By the expansion force exerted by the spring 39, the shaft 35 slides upwards and the upper end of the plunger 34 is moved upwards to contact the inside top end of the sleeve 32. Thus, the ball 36 is departed from the valve seat 56. Thus, the inflow opening 52 is communicated again with the outflow openings 50 through the communication hole 54 to open the valve.

The sleeve 32 will be explained in detail below.

The sleeve 32 is ferromagnetized throughout by drawing work and ironing work and then locally non-magnetized in a desired region by high frequency heating, as described in Examples 1 to 4. Position and span or width of the non-magnetized region give a large influence on the magnetic force acting on the plunger 34. That is, the electromagnetic valve of this Example is formed so that a clearance 60 is provided between the plunger 34 and the stator 33 within the axial length of the coil 31. By providing the clearance 60 within the axial length of the coil 31, a decrease in the magnetic force due to leakage of magnetic flux can be prevented when an electric current is applied to the coil 31.

The span or width of the non-magnetized part 32b formed in the sleeve 32 also contributes to prevent a decrease in the magnetic force.

Figure 16:
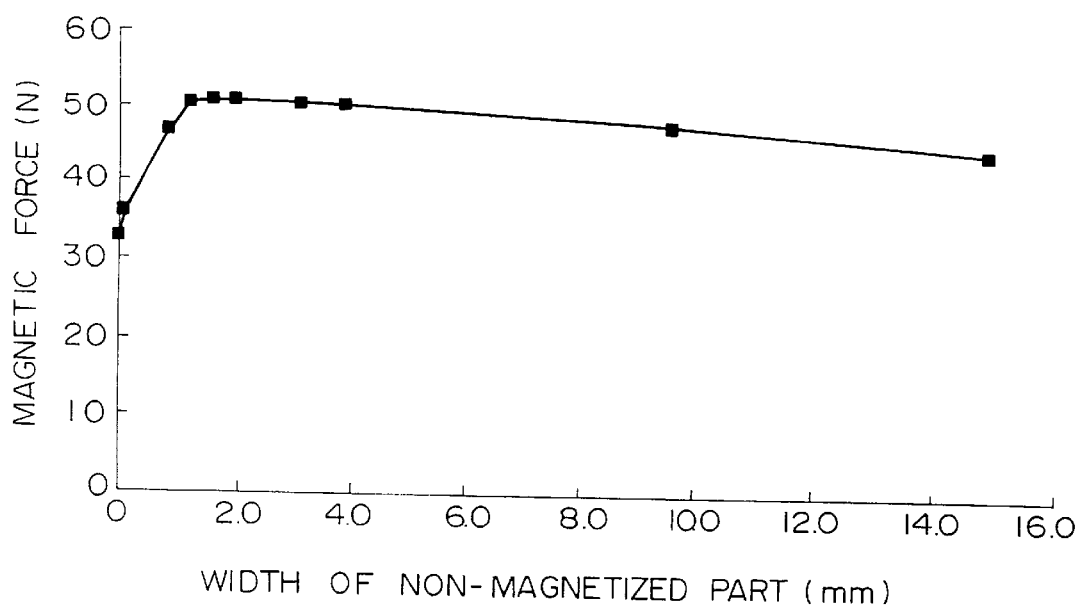
FIG. 16 is a diagram showing a relationship between the width of a non-magnetized part in an electromagnetic valve and a magnetic force.

FIG. 16 shows a relationship between a span or width of non-magnetized part 32b and a magnetic force.

Figure 17:
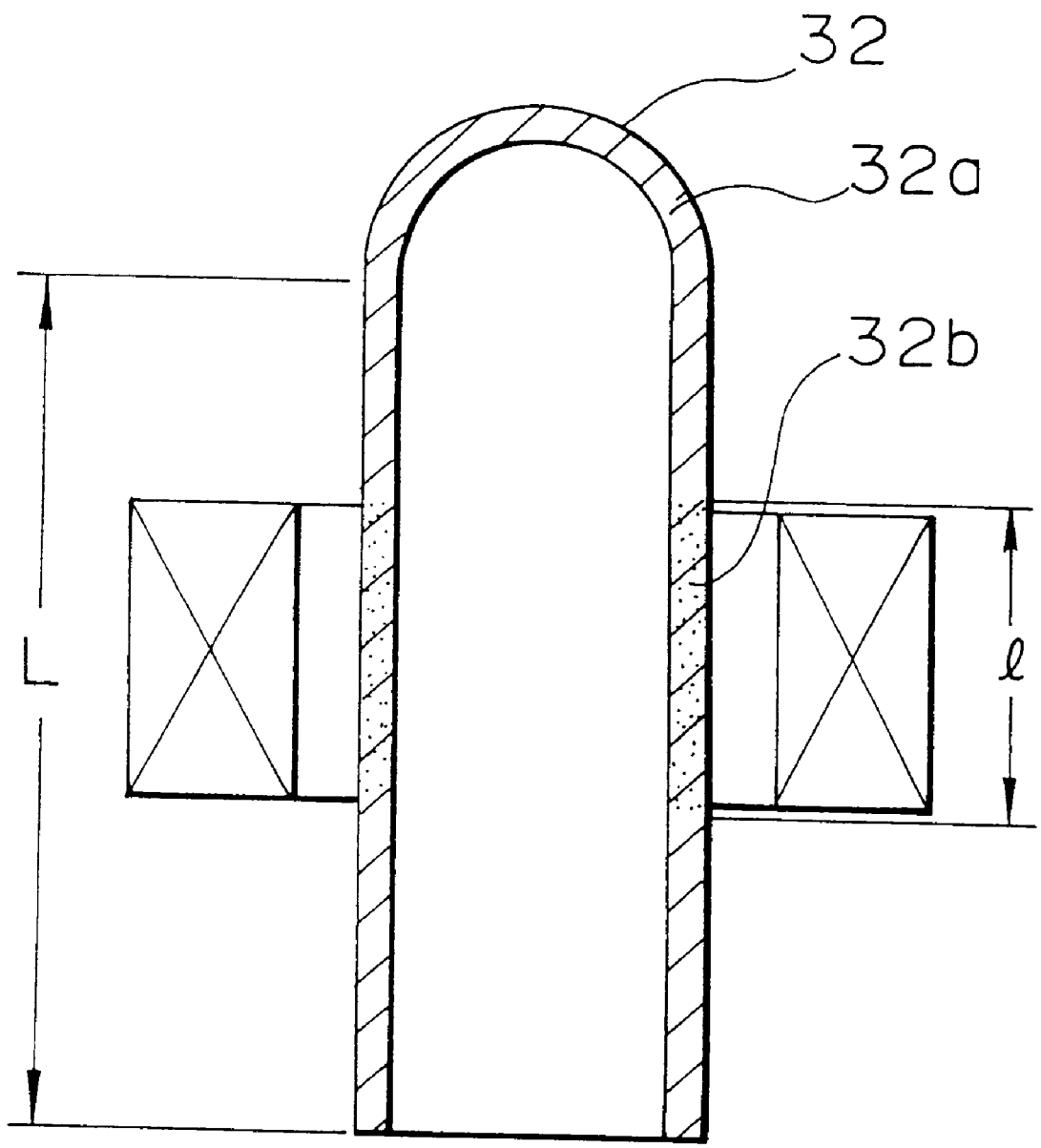
FIG. 17 is a view showing a relationship between the width of a non-magnetized part in an electromagnetic valve and that of a ferromagnetized part.

As is apparent from FIG. 16, the magnetic force is abruptly lowered when the span or width of the non-magnetized part 32b is less than 1 mm, and thus the lower limit width must be 1 mm. Furthermore, as shown in FIG. 17, when the upper limit width of the non-magnetized part 32b is set to an l/L ratio of not more than 0.95, where L is the axial length of sleeve 32 and l is the axial length of non-magnetized part 32b, a sufficiently satisfied magnetic force can be obtained, because when the width of non-magnetized part 32b is less than 1 mm, a relative magnetic permeability $\mu$ at the clearance 60 is smaller than that of non-magnetized part 32b of the sleeve 32, and consequently the magnetic circuit that goes through the clearance 60 will go around the non-magnetized part 32b of the sleeve 32, and the magnetic force onto the plunger 34 will be lowered.

Furthermore, when a ratio l/L is more than 0.95, the width of the ferromagnetized part 32a will be smaller and consequently the magnetic flux that generates a magnetic circuit will be saturated, and the magnetic force will be also lowered.

In FIG. 15, the ferromagnetization of sleeve 32 was uniformly carried out along the entire axial length of sleeve 32 by further ironing work within a temperature range not exceeding the Md point, as in Examples 6 to 13, and the magnetic force was stabilized thereby.

Furthermore, not only uniform ferromagnetization but also higher dimensional precision could be obtained at the same time by drawing work, followed by ironing work.

When the conventional composite magnetic member having a ferromagnetized part and a non-magnetized part, as integrally formed, was used as a sleeve 32 for an electromagnetic valve, the top end part of sleeve 32 was ferromagnetized, and thus when an electric current was passed through a coil 31, the generated magnetic flux went not only along the side surface of the sleeve 32, as shown in FIG. 15, but also went around the top end part. Thus, the magnetic force was lowered.

In the present invention, on the other hand, the sleeve 32 was formed by cold working the top end part of the sleeve 32 at a lower degree of plastic deformation than that of the side surface of the sleeve 32, and thus a lower stress was applied to the top end part of the sleeve 32, thereby lowering the ferromagnetization level at the top end part, as compared with that along the side surface. That is, two ferromagnetized parts having different ferromagnetization levels could be formed on the same sleeve 32, and thus when the upper end of plunger 34 was made to contact the inside periphery at the top end part of the sleeve 32 in a point or line contact state, the magnetic flux no more went around the top end part of the sleeve 32. Thus, in the present invention uniform and sufficient ferromagnetic characteristics were obtained at the site where such characteristics were required, and the ferromagnetic characteristics could be suppressed to a lower level at the site where not required.

In the present electromagnetic valve, the magnetic flux density $B_{4000}$ was made to be not less than 0.3 T as the ferromagnetization level on the side surface of the sleeve, whereby the magnetic force could be stabilized.

After the entire sleeve 32 was ferromagnetized by ironing work, non-magnetized part 32b was locally formed on the sleeve 32 by conducting local high frequency heating to the part desired to be non-magnetized from the outside or the inside of the sleeve 32, thereby uniformly conducting solid-solution treatment of the desired part on all the outer and inner peripheral sides at the same time. Thus, the high frequency-heated part of sleeve 32 could be completely and uniformly non-magnetized with a better dimensional precision. By making the relative magnetic permeability $\mu$ as a non-magnetic level not more than 1.2, the magnetic force could be stabilized.

By employing the present composite magnetic member comprising at least one ferromagnetized part 32a and at least one non-magnetized part 32b, as continuously and integrally formed, as the sleeve 32 for the electromagnetic valve 30, as shown in this Example 16, the magnetic flux could be effectively generated by passing an electric current through the coil 31, while considerably reducing the magnetic resistance at the ferromagnetized part 32a of sleeve 32, contributing to efficient driving of plunger 34. Thus, the magnetic force could be increased by about 40% over that of the conventional sleeve having only the non-magnetized part. That is, the amount of coil could be reduced, corresponding to the 40% increase in the magnetic force, and the electromagnetic valve could be made considerably smaller in the size.

Still furthermore, the drawing work and ironing work were used in the formation of sleeve 32, and thus the desired parts could be made thin to an extreme limit with a better dimensional precision, whereby the electromagnetic valve could be made much smaller in the size.

EXAMPLE 17

Figure 18:
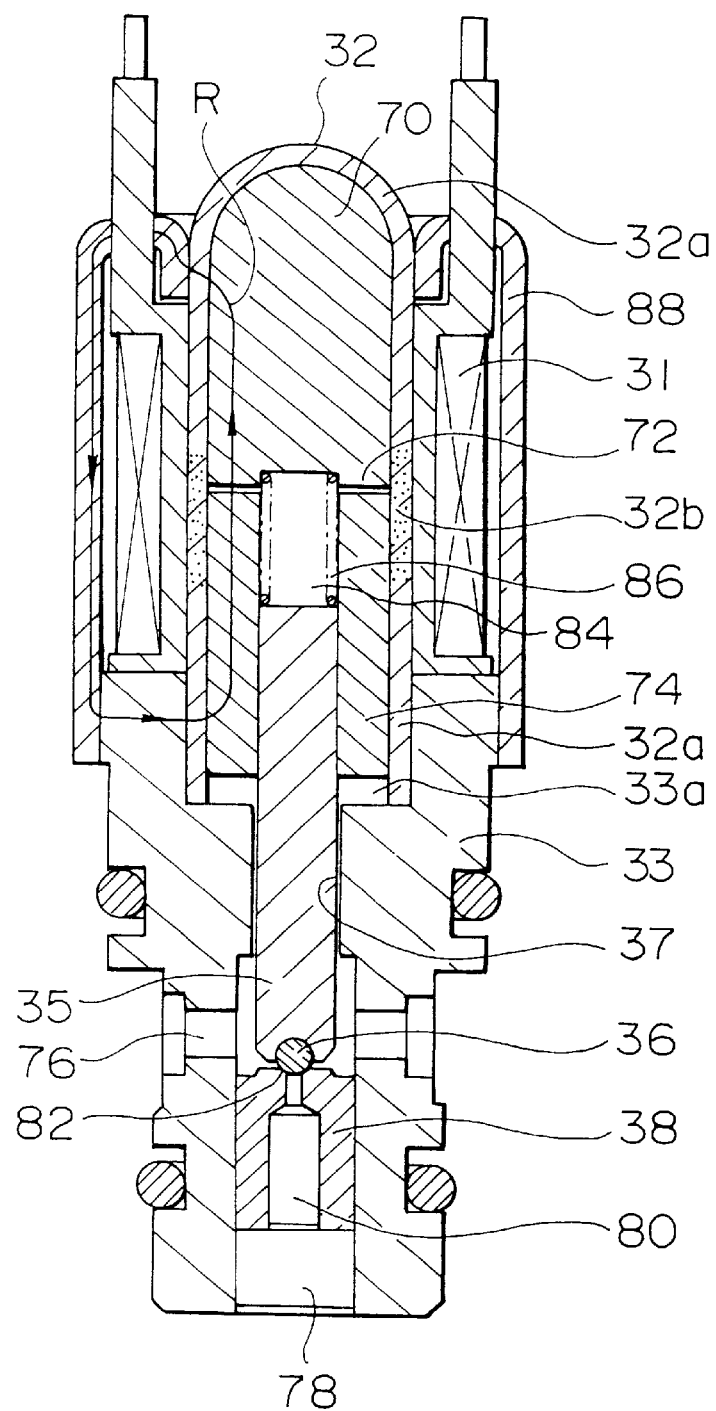
FIG. 18 is a vertical cross-sectional view of an electromagnetic valve using the present composite magnetic member.

FIG. 18 is a vertical cross-sectional view of another electromagnetic valve for opening or closing, for example, an oil hydraulic line, using the present composite magnetic member, where identical members to those of FIG. 15 are identified with the identical numerals.

The electromagnetic valve shown in FIG. 18 has also a sleeve 32 with two ferromagnetized parts 32a and one non-magnetized part 32b coaxially with a coil 31, and the sleeve 32 is inserted into a hole 33a of a stator 33 as a ferromagnetic core and hermetically bonded to the stator 33 by bonding such as welding, etc. so as to prevent any leakage of an oil-hydraulic fluid.

A ferromagnetic stopper 70 is hermetically fixed to the inside top end of sleeve 32 by a hermetically fixing means such as welding, caulking, etc. Below the lower end of the stopper 70 and inside the sleeve, a slidable ferromagnetic plunger 74 is inserted into the sleeve 32, as separated by a non-magnetic plate 72. The plunger 74 is fixed to the upper end part of a shaft 35 at a given distance from the top end of the plunger 74 to provide a hollow space 84 and a ball 36 is fixed to the lower end of the shaft 35.

An insertion hole 37 through which the shaft 35 can slidably move is formed through the stator 33 in the axial direction. Inflow openings 76 are provided through the stator 33 at the ball 36-fixing end, i.e. lower end, of the shaft 35, and a seat valve 38 with a valve seat 82 is inserted into an outflow opening 78 at a contacting position with the ball 36, and a hole 80 that communicates the inflow openings 76 with the outflow opening 78 is provided through the seat valve 38 in the axial direction.

Into a hollow space 84 formed between the top end of the plunger 74 and the upper end part of the shaft 35, a spring 86 is provided between the lower end of the stopper 70 and the upper end of the shaft 35 to exert an expansion force so that the fixed assembly of the plunger 74 and the shaft 35 can move downwards to put the ball 36 onto the valve seat 82. A ferromagnetic yoke 88 is provided in contact with the stator 33 and the sleeve 32 to cover the outer periphery of a coil 31.

Working of the electromagnetic valve of this Example 17 will be explained below.

Normally, the fixed assembly of shaft 35 and plunger 74 is pushed downwards in the axial direction by the expansion force exerted by the spring 86 to put the ball 36 onto the valve seat 82. Thus, communication of the inflow openings 76 with the outflow opening 78 is shut off and also the flow of the oil-hydraulic fluid is shut off.

When the valve is to be opened, on the other hand, an electric current is passed through the coil 31 to excite the coil 31, and a magnetic circuit is generated, as shown by an excitation route R in FIG. 18, in the direction of yoke 88→stator 33→lower ferromagnetic part 32a of sleeve 32→plunger 74→stopper 70→upper ferromagnetic part 32a of sleeve 32, whereby the plunger 74 is attracted upwards in the axial direction and the shaft 35 slidably move upwards through the insertion hole 37. Thus, the ball 36 is departed from the valve seat 82, and the inflow openings 76 are communicated with the outflow opening 78 through the communication hole 80 to open the valve. Thus, the oil-hydraulic fluid flows from the inflow openings 76 to the outflow opening 78.

When the valve is to be closed, passage of the electric current to the coil 31 is shut off to decay the magnetic circuit. The fixed assembly of the shaft 35 and the plunger 74 slidably moves downwards in the axial direction by the expansion force exerted by the spring 86 to put the ball 36 onto the valve seat 82. Thus, the communication of inflow openings 76 with the outflow opening 78 is shut off, and the valve is closed.

In Example 17, the present composite magnetic member comprising two ferromagnetized parts 32a and one non-magnetized part 32b, as continuously and integrally formed, was employed as the sleeve 32, and the shaft 35 could be driven under a severe temperature condition without any change in the magnetic characteristics.

In Example 17, the present composite magnetic member is used in an electromagnetic valve for controlling the oil hydraulic line. The present electromagnetic valve is not limited to electromagnetic valves for controlling the oil hydraulic line, but the present compound magnetic member can be employed, for example, in electromagnetic valves for use in injectors, etc. and in those for controlling a flow rate of a gas, etc.

What is claimed is:

1. A composite magnetic member, which comprises a metallic member comprising not more than 0.6 wt % C, 12 to 19 wt % Cr, 6 to 12 wt % Ni, not more than 2 wt % Mn, not more than 2 wt % Mo, and not more than 1 wt % Nb, and having the following properties:

Hirayama's equivalent, defined as (Ni wt %)+1.05 (Mn wt %)+0.65 (Cr wt %)+0.35 (Si wt %)+12.6 (C wt %), is in a range of from 20 to 23 wt %;

Nickel equivalent, defined as (Ni wt %)+30 (C wt %)+0.5 (Mn wt %), is in a range of from 9 to 12 wt %; and Chromium equivalent, defined as (Cr wt %)+(Mo wt %)+1.5 (Si wt %)+0.5 Nb wt %, is in a range of from 16 to 19 wt %, wherein the metallic member includes at least one ferromagnetized part having a magnetic flux density $B_{4000}$ of not less than 0.3 T and at least one non-magnetized part having a relative magnetic permeability $\mu$ of not more than 1.2 at a temperature as low as −40° C., as continuously and integrally formed, the non-magnetized part having crystal grain sizes of not more than 30 $\mu$m.

2. A composite magnetic member, which comprises a metallic member consisting essentially of not more than 0.6 wt % C, 12 to 19 wt % Cr, 6 to 12 wt % Ni, not more than 2 wt % Mn, not more than 2 wt % Mo, and not more than 1 wt % Nb, and the balance Fe and inevitable impurities and having the following properties:

Hirayama's equivalent, defined as (Ni wt %)+1.05 (Mn wt %)+0.65 (Cr wt %)+0.35 (Si wt %)+12.6 (C wt %), is in a range of from 20 to 23 wt %;

Nickel equivalent, defined as (Ni wt %)+30 (C wt %)+0.5 (Mn wt %), is in a range of from 9 to 12 wt %; and Chromium equivalent, defined as (Cr wt %)+(Mo wt %)+1.5 (Si wt %)+0.5 Nb wt %, is in a range of from 16 to 19 wt %, wherein the metallic member includes at least one ferromagnetized part having a magnetic flux density $B_{4000}$ of not less than 0.3 T and at least one non-magnetized part having a relative magnetic permeability $\mu$ of not more than 1.2 at a temperature as low as −40° C., as continuously and integrally formed, the non-magnetized part having crystal grain sizes of not more than 30 $\mu$m.

* * * * *